(12) United States Patent
Fujita et al.

(10) Patent No.: US 10,929,137 B2
(45) Date of Patent: Feb. 23, 2021

(54) ARITHMETIC PROCESSING DEVICE AND CONTROL METHOD FOR ARITHMETIC PROCESSING DEVICE

(71) Applicant: FUJITSU LIMITED, Kawasaki (JP)

(72) Inventors: Hisanari Fujita, Yokohama (JP); Ryohei Okazaki, Kawasaki (JP); Takashi Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/597,410

(22) Filed: Oct. 9, 2019

(65) Prior Publication Data
US 2020/0117461 A1   Apr. 16, 2020

(30) Foreign Application Priority Data

Oct. 10, 2018   (JP) .............................. JP2018-191778

(51) Int. Cl.
*G06F 9/38*   (2018.01)
*G06F 9/30*   (2018.01)

(52) U.S. Cl.
CPC ............ *G06F 9/382* (2013.01); *G06F 9/3804* (2013.01); *G06F 9/3822* (2013.01); *G06F 9/3844* (2013.01); *G06F 9/3861* (2013.01)

(58) Field of Classification Search
None
See application file for complete search history.

(56) References Cited

U.S. PATENT DOCUMENTS

| | | | |
|---|---|---|---|
| 9,135,015 B1* | 9/2015 | Mizrahi | G06F 9/3808 |
| 2005/0125634 A1 | 6/2005 | Ishizuka | |
| 2009/0172360 A1 | 7/2009 | Hikichi | |
| 2011/0107071 A1* | 5/2011 | Jacob | G06F 9/3808 |
| | | | 712/238 |
| 2016/0179536 A1* | 6/2016 | Mizrahi | G06F 9/46 |
| | | | 712/245 |
| 2017/0277538 A1* | 9/2017 | Friedmann | G06F 9/3867 |
| 2017/0293646 A1* | 10/2017 | Rozario | G06F 16/2365 |

(Continued)

FOREIGN PATENT DOCUMENTS

| | | |
|---|---|---|
| WO | 2008/029450 A1 | 3/2008 |
| WO | 2004/031944 A1 | 4/2014 |

*Primary Examiner* — Hyun Nam
(74) *Attorney, Agent, or Firm* — Fujitsu Patent Center

(57) ABSTRACT

An arithmetic processing device includes: a pipeline circuit including an instruction fetch circuit, an instruction decoder that performs a first branch misprediction determination for a branch instruction, and issues the instructions in-order, a branch instruction processing circuit which performs a second branch misprediction determination for the branch instruction; and a commit processing circuit that executes a commit processing of the processed instructions in-order. When a branch misprediction is established in the first branch misprediction determination, the instruction decoder inhibits issuing of the instructions to the branch prediction destination from the instruction decoder, and when the first branch instruction for which the branch misprediction is established is inputted, the branch instruction processing circuit clears the pipeline state in the instruction decoder, allows the instruction fetch circuit to start fetching instructions to a correct branch destination, and releases the inhibit of issuing of the instructions from the instruction decoder.

9 Claims, 14 Drawing Sheets

(56) References Cited

U.S. PATENT DOCUMENTS

2017/0315810 A1* 11/2017 Eickemeyer ............ G06F 9/322
2017/0322875 A1* 11/2017 Gschwind ........... G06F 12/0875
2018/0129577 A1*  5/2018 Dusanapudi .......... G06F 11/263
2019/0303161 A1* 10/2019 Nassi .................... G06F 9/3844
2019/0370001 A1* 12/2019 Teyssier ................. G06F 9/321

* cited by examiner

FIG. 14

DESCRIPTION OF CYCLES

| REFERENCE SIGN | DESCRIPTION OF CYCLE |
|---|---|
| IF1 | INSTRUCTION FETCH FIRST CYCLE |
| IF2 | INSTRUCTION FETCH SECOND CYCLE |
| D1 | INSTRUCTION DECODE FIRST CYCLE |
| D2 | INSTRUCTION DECODE SECOND CYCLE |
| RS1 | RESERVATION STATION FIRST CYCLE |
| RS2 | RESERVATION STATION SECOND CYCLE |
| E1 | OPERATION FIRST CYCLE |
| E2 | OPERATION SECOND CYCLE |
| C1 | COMMIT FIRST CYCLE |
| C2 | COMMIT SECOND CYCLE |

ARITHMETIC PROCESSING DEVICE AND CONTROL METHOD FOR ARITHMETIC PROCESSING DEVICE

CROSS-REFERENCE TO RELATED APPLICATION

This application is based upon and claims the benefit of priority of the prior Japanese Patent Application No. 2018-191778, filed on Oct. 10, 2018, the entire contents of which are incorporated herein by reference.

FIELD

The present invention relates to an arithmetic processing device and a control method for an arithmetic processing device.

BACKGROUND

An arithmetic processing device (or a processor or a central processing unit (CPU), hereafter called a processor) fetches instructions in memory, decodes the instructions, and issues the decoded instructions to a logic-arithmetic processing device or the like according to the sequence of the program (in-order execution). A reservation station in the processor inputs the instructions, which were issued in-order, to the logic-arithmetic processing device from an instruction that has become ready for the logic-arithmetic processing (out-of-order execution), and performs the logic-arithmetic processing. Thereby the processor performs the logic-arithmetic processing for the instructions out-of-order, which is different from the sequence of the program. Then a commit stack entry in the processor performs the commit processing (completion processing) of the instructions in-order. Thereby the processor increases execution efficiency of the instructions of the program.

The instruction decoder, the logic-arithmetic processing device and the like are constituted of pipelined circuits. By pipelining, the processor executes a plurality of instructions in parallel with shifting timings, whereby instruction execution efficiency of the program improves. Recently pipeline lengths tend to be longer as the dock frequencies have become higher.

On the other hand, in a case where a processor does not execute subsequent instructions until a branch destination of the branch instruction is fixed, execution disable state becomes longer as the time required to fix the branch destination increases. Therefore, the processor includes a branch prediction unit/circuit which predicts the branch destination of the branch instruction, and speculatively executes the instructions to the predicted branch destination before the branching destination of the branch instruction is fixed.

In the case of speculatively executing subsequent instructions of a branch instruction, performance improves when the branch prediction is correct at the determination of the branching destination. However, when the branch destination prediction is not correct, all execution states of the instructions to the branch prediction destination of the branch instruction in the pipeline circuit are cancelled, and the instruction to the correct branch destination is executed. Thereby the program operates correctly. The instructions speculatively executed are not commit-processed and the architecture register defined by the instruction set is not updated until the branch instruction is committed (completed). Therefore, the state in the pipeline circuit of the instructions, which are being speculatively executed, can be cancelled. For more details on branch instruction, see WO 2008/029450 and WO 2004/031944.

SUMMARY

A reservation station (reservation station for branch: RSBR), which is an execution queue for branch instructions in the processor, is a branch instruction processing unit/circuit which performs branch determination including: determination whether branching of the branch instruction is possible or satisfied, and determination of the branch destination. Then the RSBR compares the result of the branch determination of the branch instruction and the branch prediction of the branch prediction unit/circuit, and determines whether branch misprediction has occurred.

However, instructions to the branch prediction destination of the branch instruction are continuously issued to the pipeline circuit until the RSBR detects the branch misprediction and the branch misprediction is established. Hence at a point when the branch misprediction is established, execution state of a plurality of instructions, which are speculatively executed, have been generated in the pipeline circuit.

Hence, pipeline clear is performed to dear the execution state of the instructions, which were speculatively executed after the branch instruction, from the pipeline circuit. One method of the pipeline clear is clearing all the operation states in the pipeline circuit when a commit stack entry (CSE) executes the commit processing of the branch instruction in-order, and starts issuing instructions to a correct branch destination. Thereby clearing the execution states of instructions before the branch instruction is prevented, and it is possible to clear only the execution states in the pipeline circuit of the instructions to the branch prediction destination of the branch instruction, which are speculatively being executed.

In the case where the processing of an instruction, before the branch instruction, takes a long time (e.g. load instruction which may generate a cache miss), however, the commit processing of the branch instruction by the CSE is delayed, and the issuance of an instruction to a correct branch destination is delayed as well, which leads to a drop in processing efficiency of the program.

One aspect of the present embodiment is an arithmetic processing device, comprising: a pipeline circuit including a pipeline structure which includes, an instruction fetch circuit that fetches instructions, an instruction decoder that decodes the fetched instructions, performs first branch misprediction determination for a branch instruction, and issues the decoded instructions in-order, an instruction processing circuit that processes instructions other than the branch instruction issued by the instruction decoder, and a branch instruction processing circuit to which the branch instruction issued by the instruction decoder is inputted, and which performs second branch misprediction determination for the branch instruction; and a commit processing circuit that executes a commit processing of the instructions processed by the instruction processing circuit and the branch instruction processing circuit of the pipeline circuit in-order, wherein when a branch misprediction is established in the first branch misprediction determination, the instruction decoder inhibits issuing of the instructions to the branch prediction destination of the branch instruction, from the instruction decoder, and wherein when the first branch instruction for which the branch misprediction is established by the instruction decoder is inputted, the branch instruction processing circuit clears the pipeline state in the instruction decoder and earlier circuits to the instruction decoder, allows the instruction fetch circuit to start fetching instructions to a correct branch destination, and releases the inhibit of issuing of the instructions from the instruction decoder.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a table indicating the operation cycles of the pipeline circuit.

DESCRIPTION OF EMBODIMENTS

Figure 1:
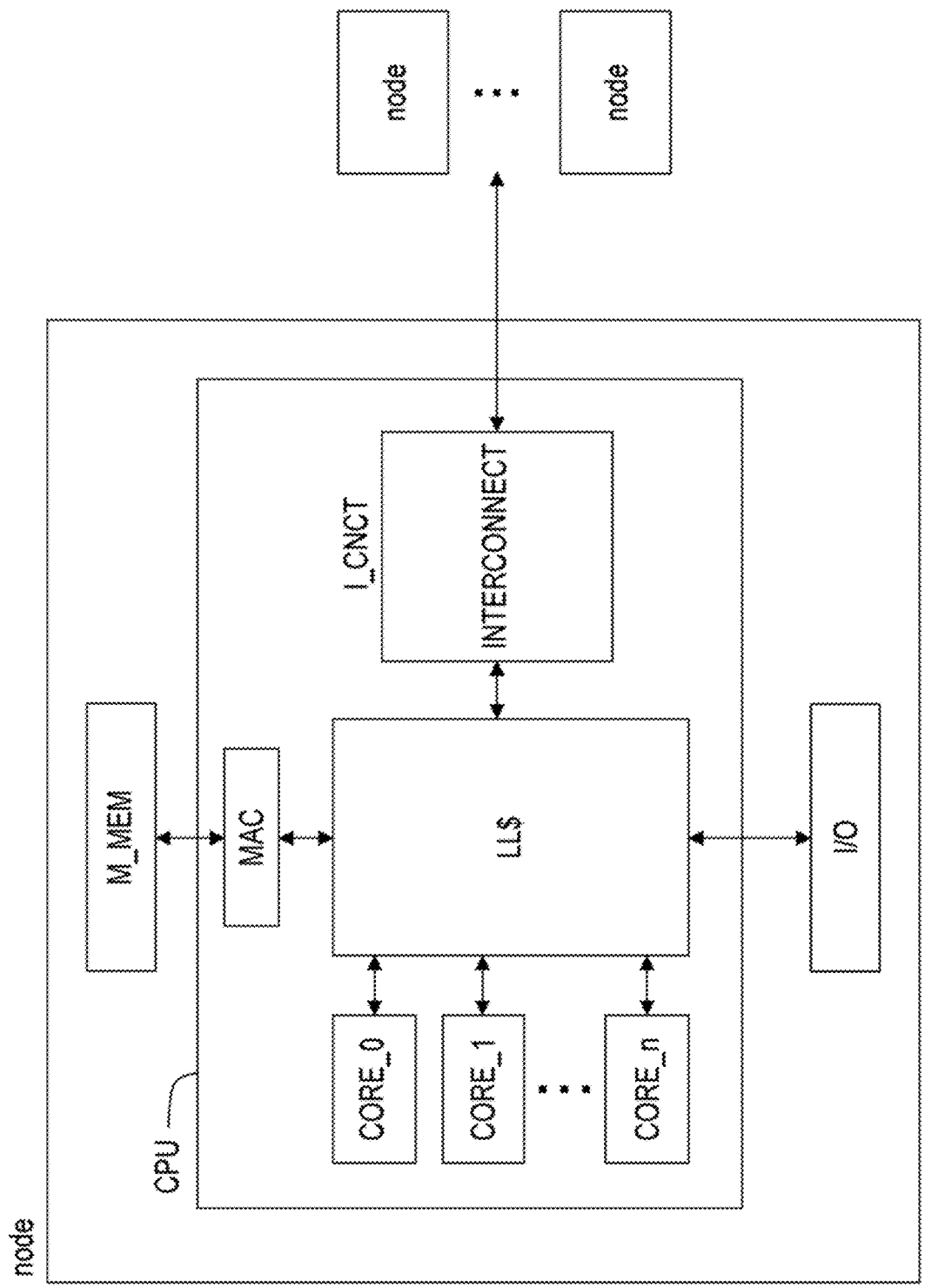
FIG. 1 is a block diagram of an information processing apparatus including a processor of this embodiment.

Processor of this Embodiment and Information Processing Apparatus Including Processor FIG. 1 is a block diagram of an information processing apparatus including a processor of this embodiment. An information processing apparatus, a high-performance computer (HPC) and a supercomputer include a processor (central processing unit) CPU, a main memory M_MEM, and input/output unit I/O in each of a plurality of nodes. The processor CPU in each node performs packet communication with each other via an interconnect I_CNCT disposed in the processor.

The processor CPU, which is an arithmetic processing device, includes: a plurality of cores CORE_0 to CORE_n; a last level cache (LL$) shared by the plurality of cores; a memory access control unit MAC which controls access to the memory; and the interconnect I_CNCT which controls packet communication with processors of other nodes. Each core CORE includes an instruction decoder, a logic-arithmetic processing unit, an L1 cache, and the like as described later. The last level cache LL$ in FIG. 1 is a second level cache or L2 cache, for example.

Figure 2:
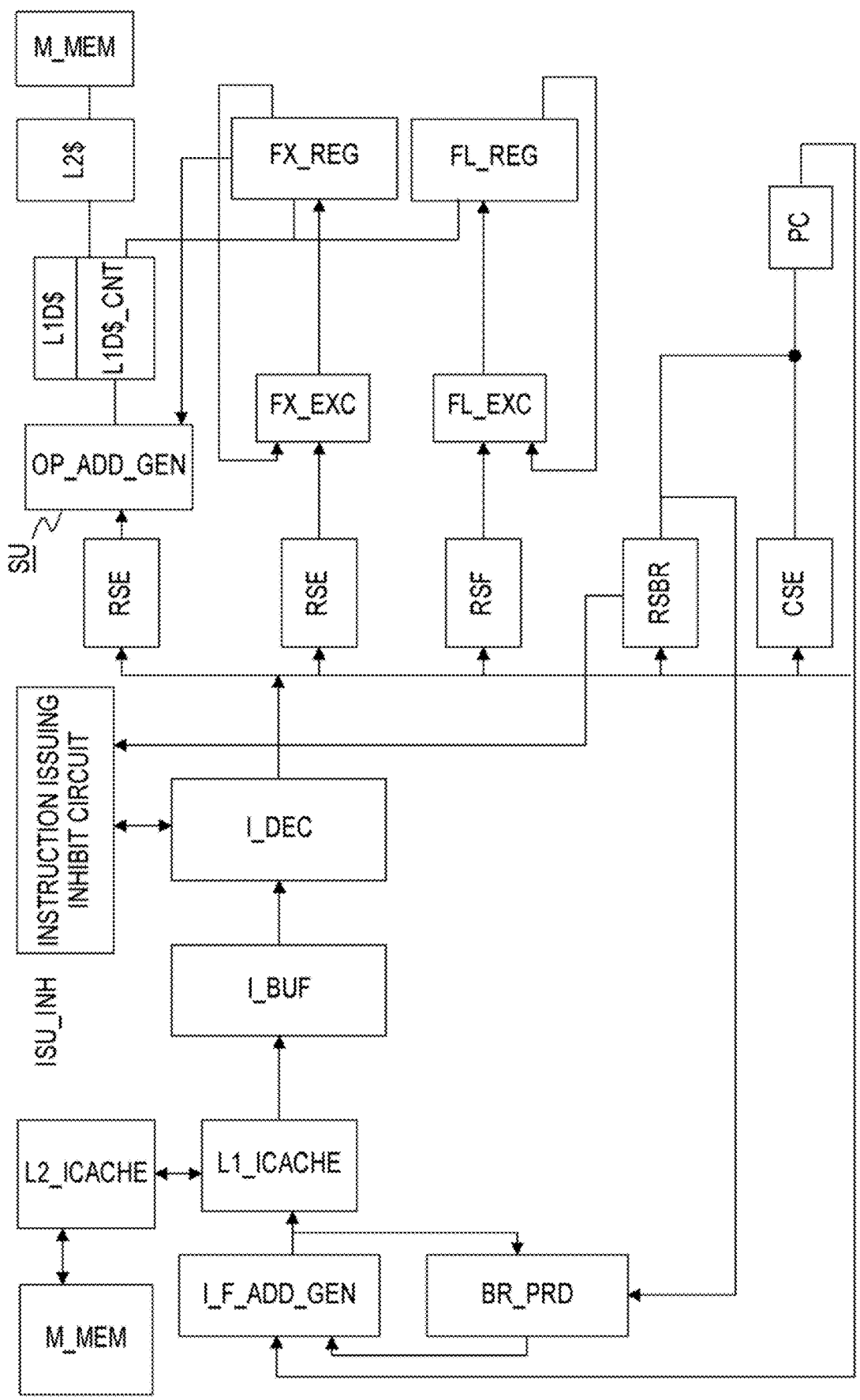
FIG. 2 is a diagram depicting a configuration example of the processor, mainly of the core, according to this embodiment.

FIG. 2 is a diagram depicting a configuration example of the processor, mainly of the core, according to this embodiment. As an instruction control unit, the processor in FIG. 2 includes: an instruction fetch address generator I_F_ADD_GEN which is an instruction fetch unit/circuit; an L1 instruction cache L1_ICACHE; an L2 instruction cache L2_ICACHE; an instruction buffer I_BUF; an instruction decoder I_DEC; and reservation stations RSA, RSE and RSF, which enter a plurality of instructions, issued by the instruction decoder, and input the plurality of instructions to the arithmetic unit. The instruction control unit also includes a branch instruction reservation station RSBR and a commit stack entry CSE.

Further, the processor includes a plurality of arithmetic units, that is, a storage unit SU, a fixed-point arithmetic unit FX_EXC, and a floating point arithmetic unit FL_EXC. Each of these arithmetic units may be one unit or a plurality of units.

The storage unit SU includes an operand address generator OP_ADD_GEN, which includes an addition-subtraction circuit for calculating addresses, and an L1 data cache L1D$. In addition to the cache memory, the L1 data cache L1D$ includes an L1 cache control unit L1$_CNT which controls the cache memory.

The fixed-point arithmetic unit FX_EXC and the floating point arithmetic unit FL_EXC include an addition-subtraction circuit, a logic-arithmetic unit, a multiplexer and the like, for example. The floating point arithmetic unit includes a number of arithmetic units corresponding to the width of a single instruction multiple data (SIMD), for example, so as to be able to perform the SIMD operation. The processor includes a fixed-point register file FX_REG and a floating point register file FL_REG for storing the processing results of these arithmetic units. These register files include a plurality of registers, some of which are a renaming register in which the processing result is stored before the instruction commit processing, and an architecture register in which the processing result is stored at the time of the instruction commit processing. The architecture register is a register that can be accessed via software, and is a general purpose register.

The processor further includes an L2 cache L2$ which is shared by a plurality of cores and is connected to the main memory M_MEM via a memory controller (not illustrated). An L2 instruction cache L2_ICACHE is also connected to the main memory M_MEM via the memory controller. The L2 cache L2$ is the above-mentioned last level cache.

An instruction fetch unit/circuit in the core, including an instruction fetch address generator I_F_ADD_GEN, an instruction buffer I_BUF, an instruction decoder I_DEC, a reservation station RS, an arithmetic unit EXC and the like, constitutes a pipeline circuit. In the case when a pipeline circuit includes a plurality of lines of the pipeline circuits, the pipeline circuits can process a plurality of instructions in parallel.

The general configuration of the processor will be described in accordance with the processing flow of an instruction in the pipeline circuit. The instruction fetch address generator I_F_ADD_GEN generates a fetch address, reads a fetch instruction from the L1 instruction cache L1_ICACHE according to the execution sequence in the program (in-order execution), and temporarily stores the fetch instruction in the instruction buffer I_BUF. Then the instruction decoder I_DEC inputs the fetch instruction in the instruction buffer in-order, decodes the fetch instruction, generates an execution enable instruction (execution instruction) by attaching information that is required for execution, and issues the execution instruction in-order.

Then the execution instruction issued from the instruction decoder is queued and stored in-order in a reservation station, which is a storage having a queue structure. The reservation station is an execution queue which stores the execution instructions in a queue, and is disposed for each arithmetic unit that executes an instruction.

The reservation station includes, for example, a reservation station for address generation (RSA) disposed in a storage unit SU including the L1 data cache L1D$, a reservation station for execution (RSE) disposed in the fixed point arithmetic unit FX_EXC, and a reservation station for floating point (RSF) disposed in the floating point arithmetic unit FL_EXC. The reservation station also includes a reservation station for branch (RSBR) which corresponds to the branch prediction unit/circuit BR_PRD.

Herein below, reservation station is abbreviated to RS when appropriate.

The execution instruction queued in each RS is entered to the corresponding arithmetic unit when an instruction execution condition is met (out-of-order execution). These conditions are, for example: whether the input operand required for executing the instruction can be read from a general-purpose register file due to the completion processing of the arithmetic processing of the previous instruction (whether the read after write (RAW) condition is satisfied); or whether the circuit resources of the arithmetic unit can be used.

The instruction decoder I_DEC, on the other hand, assigns an instruction identifier (IID) to the execution instruction according to the execution sequence in the program, and transmits the execution instruction to a commit stack entry CSE (hereafter called CSE) in-order. The CSE includes: a storage having a queue structure which stores the transmitted execution instruction in-order; and an instruction commit processing unit/circuit which executes the commit processing (completion processing) of each instruction based on the information in the queue and the like, responding to the processing completion report of the instruction from the pipeline circuit of the arithmetic circuit. Therefore, the CSE is a commit processing circuit (commit processing unit) which performs the commit processing of the instruction.

The execution instruction is stored in the queue in the CSE in-order, and waits for the processing completion report of the instruction from each arithmetic unit. Then, as mentioned above, the execution instruction is sent from each RS to the arithmetic unit out-of-order, and is executed by the arithmetic unit. When the instruction processing completion report is sent to the CSE, the instruction commit processing unit of the CSE performs the commit processing of the execution instruction that corresponds to the processing completion report, in-order, out of the instructions which are queued and waiting for the processing completion report, and updates the circuit resources, such as registers. The CSE increments the program counter PC in the commit processing.

The branching of the branch instruction that is queued in the RSBR for branch processing is predicted by the branch prediction unit/circuit BR_PRD, and based on the prediction result, the instruction fetch address generator I_F_ADD_GEN generates the branch destination address. Responding to this, the instruction based on the branch prediction is read from the instruction cache and is speculatively executed by the arithmetic unit via the instruction buffer and the instruction decoder. The RSBR performs the branch determination, which determines whether branching of the branch instruction is possible, and detects the branch destination. Further, the RSBR compares the branch determination result and the branch prediction of the branch prediction circuit, and determines whether a branch misprediction occurred.

The core of the processor also includes an instruction issuing inhibit circuit ISU_INH which inhibits (forbids) issuing of an instruction from the instruction decoder or releases the inhibition. The instruction issuing inhibit circuit is controlled to enable the instruction issuing inhibit trigger (inhibit state), by the instruction decoder, or is controlled to disable the inhibit trigger (inhibit released state) by the RSBR or the CSE.

[Example of Drop in Program Execution Efficiency]

The RSBR performs the branch determination, which determines whether the branching of the branch instruction is possible and determines the branch destination, and determines whether a branch misprediction occurred. If the branch misprediction is established by the branch misprediction determination, the RSBR performs a pipeline clear that dears the execution state of an instruction that is being speculatively executed based on the branch prediction in the pipeline circuit. However, the timing of the pipeline clear is delayed until the CSE completes the commit processing of the branch instruction. This means that the more delayed completion of the instructions prior to the branch instruction, the more delayed the timing of the pipeline clear, and the start of fetching the instructions to the correct branch destination is delayed more as well. As a result, the program execution efficiency drops.

[Example of Security Vulnerability of Processor]

Figure 3:
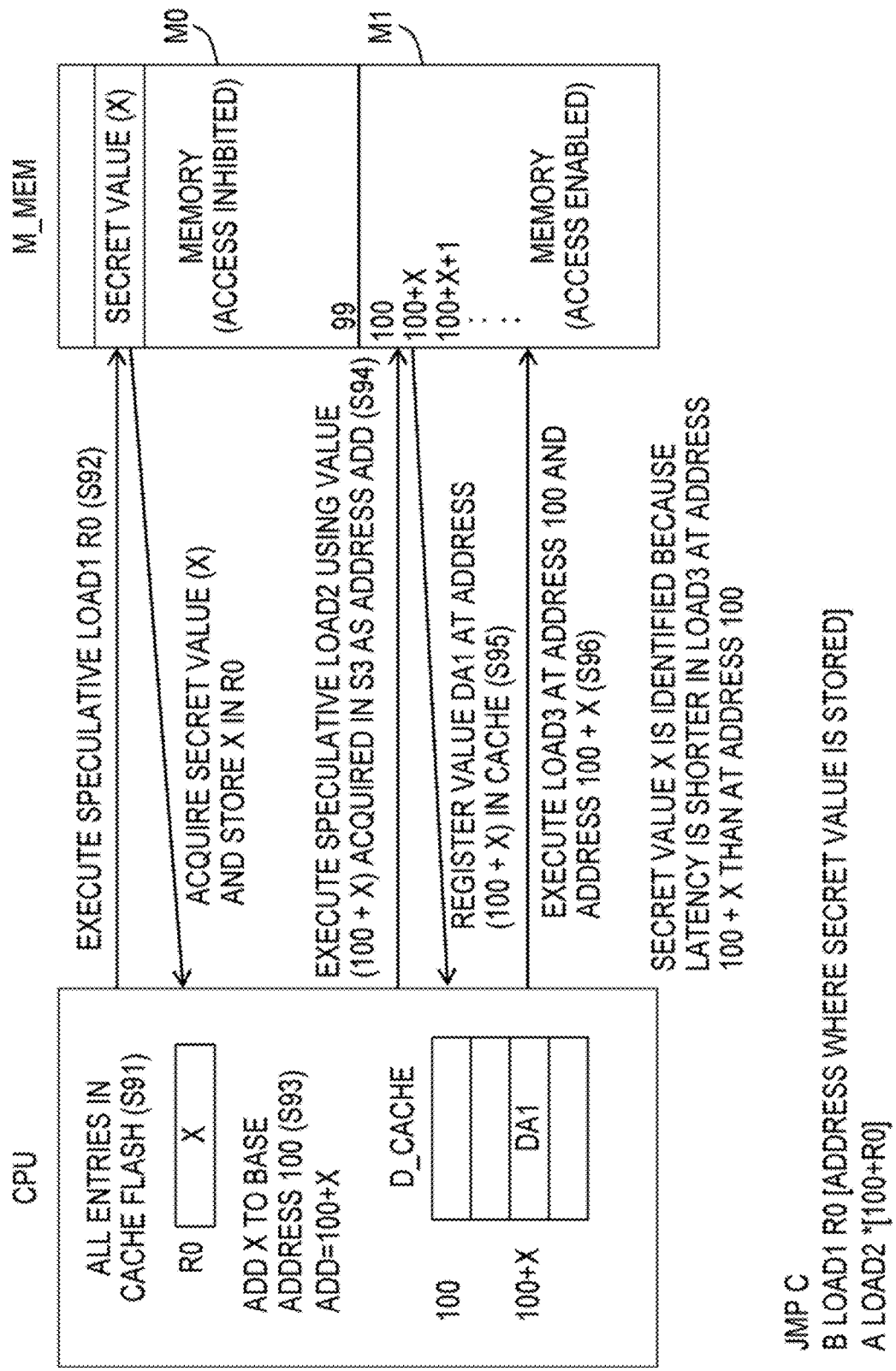
FIG. 3 is a diagram depicting a security vulnerability of a processor.

FIG. 3 is a diagram depicting a security vulnerability of a processor. The security vulnerability of a processor may occur when a following illegal instruction string is executed, for example. JMP C//branch instruction to branch to branch destination C//B load1 R0 [address that stores secret value]// speculatively load using address that stores secret value and store the secret value to register R0//A LOAD2*[100+R0]// speculatively load using address (secret value) in register R0//

In the above instruction strings, an illegal load instructions "LOAD1" and "LOAD2" are added after the branch instruction JMP C. For an illegal program, the content of the cache memory is cleared first, and then an operation mode is transferred to the privilege mode (OS mode) (S91). Next, the processor executes the branch instruction JMP C in the privilege mode. The processor speculatively executes the load instruction LOAD1 of the branch prediction destination B before the branch destination C (different from A and B) of the branch instruction is established (S92). Here it is assumed that the branch prediction destination B was illegally registered as the branch prediction information, and a correct branch destination of the branch instruction is C.

When the processor speculatively executes the load instruction LOAD1 to this incorrect branch prediction destination B, the processor reads the secret value X in the protected memory region M0, of which access is allowed only in the privilege mode, and stores the secret value X in the register R0 (S92). By this load instruction, the secret value X is also registered in the L1 (Level-1) cache memory.

Further, the processor adds the secret value X to the first address "100" of the access enable region M1 (S93), and speculatively executes the next load instruction A LOAD2* [100+X] (S94). Then the load instruction LOAD2 to the address 100+X generated by adding the secret value X in the register R0 to the first address [100] results in a cache miss in the L1 cache, and the processor issues a data request to the L2 (Level-2) cache. By this data request, the data DA1 at the address 100+X in the access enable region M1, in the memory where access in the user mode is enabled, is read. As a result, the data DA1 is registered in the entry at the address 100+X in the L1 cache memory of the processor, and the L1 cache is updated (S95).

When the execution of the branch instruction JMP C completes and the branch destination is established after the two load instructions LOAD1 and LOAD2 are speculatively executed, it is known that the branch prediction destination B is a branch misprediction. As a result, the load instructions LOAD1 and LOAD2, which were speculatively executed by the pipeline circuit of the processor, become invalid, and the content of the register R0 is cleared. Since the instruction of the speculative execution is not completed, the content of the register R0, which is a renaming register, is cleared. However, the content of the cache memory is not cleared. Then the processor repeats the load instruction LOAD3 (not illustrated) while changing address, 100–(100+X) (S96), whereby the access latency of the load instruction to the address 100+X, at which the data DA1 is registered, is shorter than the other address 100, and the content of the data at the address 100+X can be known.

This leads to a drop in security of the secret value X. That is, the secret value X can be acquired based on the latency of the cache memory.

As described above, some of the causes of a vulnerability of a processor are: the load instructions LOAD1 and LOAD2 to the incorrect branch prediction destination are speculatively executed before the branch destination of the branch instruction JMP is established; and the cache registration state is maintained by execution of the LOAD2. A delay in branch determination of the branch instruction increases the time of the speculative execution, which gives a concern as to a worsening of security vulnerability.

Figure 4:
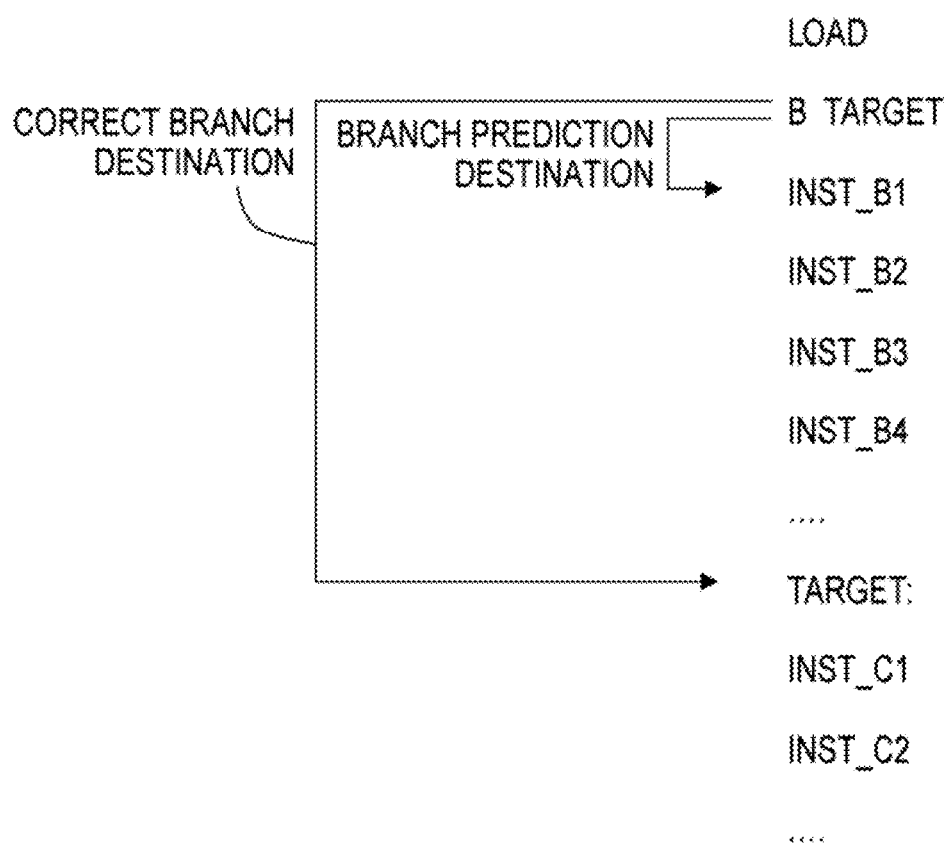
FIG. 4 is an example of a branch instruction and instruction strings before and after the branch instruction.

Branch Instruction Processing of Arithmetic
Processing Device of this Embodiment FIG. 4 is an example of a branch instruction and instruction strings before and after the branch instruction. The instruction strings indicated in FIG. 4 include a load instruction LOAD to read data at a certain address, a branch instruction B to unconditionally branch to a target TARGET, instruction strings INST_B1 to INST_B4 at a branch prediction destination, and instruction strings INST_C1, INST_C2 at a correct branch destination TARGET. The target TARGET of the branch instruction B indicates a value determined by adding a relative difference from the address of the current program counter PC to an address of the current program counter PC. In other words, the branch instruction B is an unconditional branch instruction whose branch destination is specification method is PC relative.

A branch instruction is classified into either an unconditional branch instruction which has no branch condition, or a conditional branch instruction which is based on a branch condition. In the case of the unconditional branch instruction which has no branch condition, the instruction is unconditionally branched to the branch destination, but in the case of the conditional branch instruction, the instruction is branched to the branch destination when the branch condition is true. The branch destination specification method for the unconditional branch instruction is either PC relative (e.g. the above-mentioned branch instruction B), or a method of specifying a register address where the branch destination address is stored (register indirect).

Concrete examples of the branch instruction are as follows.

B TARGET: unconditional branch instruction specified as PC relative

BR <Xn>: unconditional branch instruction specified as register indirect, by which the instruction unconditionally branches to an address stored in the register Xn B. <cond> <label>: conditional branch instruction by which the instruction branches to <label>, which indicates a branch destination, when the condition coed is true In the case of the instruction strings in FIG. 4, the branch prediction circuit has completed prediction when the branch instruction B TARGET is fetched. Then from the timing when the branch instruction B TARGET is issued from the decoder to the timing when the RSBR performs the branch determination of the branch instruction and determines the branch misprediction (branch prediction failure), that is, to the timing when the branch misprediction is established, the decoder continuously issues the instruction INST_B1 and the subsequent instruction strings INST_B2 to B4 at the branch prediction destination. When the branch misprediction is established at the RSBR, the instructions INST_C1 and INST_C2 to the correct branch destination are fetched and decoded. Then after the commit-processing of the branch instruction B is performed, and the execution state of the pipeline circuit is cleared, the instruction decoder issues fetched and decoded instructions to the correct branch destination to the corresponding RS.

As mentioned above, it is preferable that the execution state in the pipeline circuit for the instructions to the incorrect branch destination is cleared as soon as possible after the branch misprediction is established, so that fetch, decode and issuance of the instructions to the correct branch destination are performed as soon as possible.

According to this embodiment, in the case where the instruction decoder performs a first branch misprediction determination for the branch instruction. When the instruction decoder cannot determine the branch misprediction, the RSBR performs a second branch misprediction determination. First, in the case of the unconditional branch instruction specified as PC relative, the instruction decoder can perform the branch determination to determine whether branching is possible and to determines the branch destination in the stage when the instruction decoder decodes the branch instruction. The instruction decoder can determine whether the branch misprediction occurred or not can be performed by comparing the branch determination result and the branch prediction information (i.e. whether branching is possible and the branch destination) attached to the branch instruction. Second, in the case of the unconditional branch instruction specified as register indirect, the instruction decoder can complete the determination as to whether branching is possible completes in the stage when the branch instruction is decoded. Hence the branch misprediction may be established in some cases by comparing the determination result and the information whether branching is possible in the branch prediction information which is attached to the branch instruction. Third, when the branch prediction information was attached to the branch instruction due to an error in the information on the branch history memory in the branch prediction circuit, but the instruction decoder determines that the instruction is not a branch instruction, the branch misprediction is established.

In this embodiment, (1) in the case where the instruction decoder, whose pipeline stage is prior to RSBR, can detect the establishment of the branch misprediction, the instruction decoder inhibits the issuance of the instructions to the branch prediction destination of the branch instructions. Then when the RSBR processes the branch instruction, the RSBR clears the pipeline circuits from the instruction fetch address generator to the instruction decoder, i.e. the pipeline circuits including the instruction decoder and the earlier circuits to the instruction decoder, (the instruction fetch address generator, the instruction buffer and the instruction decoder), requests the instruction fetch unit/circuit to fetch the instructions to a correct branch destination, and releases the inhibition of issuing of instructions from the instruction decoder. Thereby the processing of the instruction string to the correct branch destination can be started earlier.

(2) In the case where the instruction decoder cannot determine the establishment of the branch misprediction, the RSBR clears the pipeline circuits from the instruction fetch address generator to the instruction decoder, requests the instruction fetch unit/circuit to fetch the instructions to a correct branch destination, and inhibits issuing of instructions to the branch prediction destination from the instruction decoder in the stage when the RSBR determines the establishment of the branch misprediction. Then the CSE clears the state of the pipeline circuit, generated by instructions to the branch prediction destination, and releases the inhibition of the issuing of the instructions from the instruction decoder, in the commit processing of the branch instruction.

Figure 5:
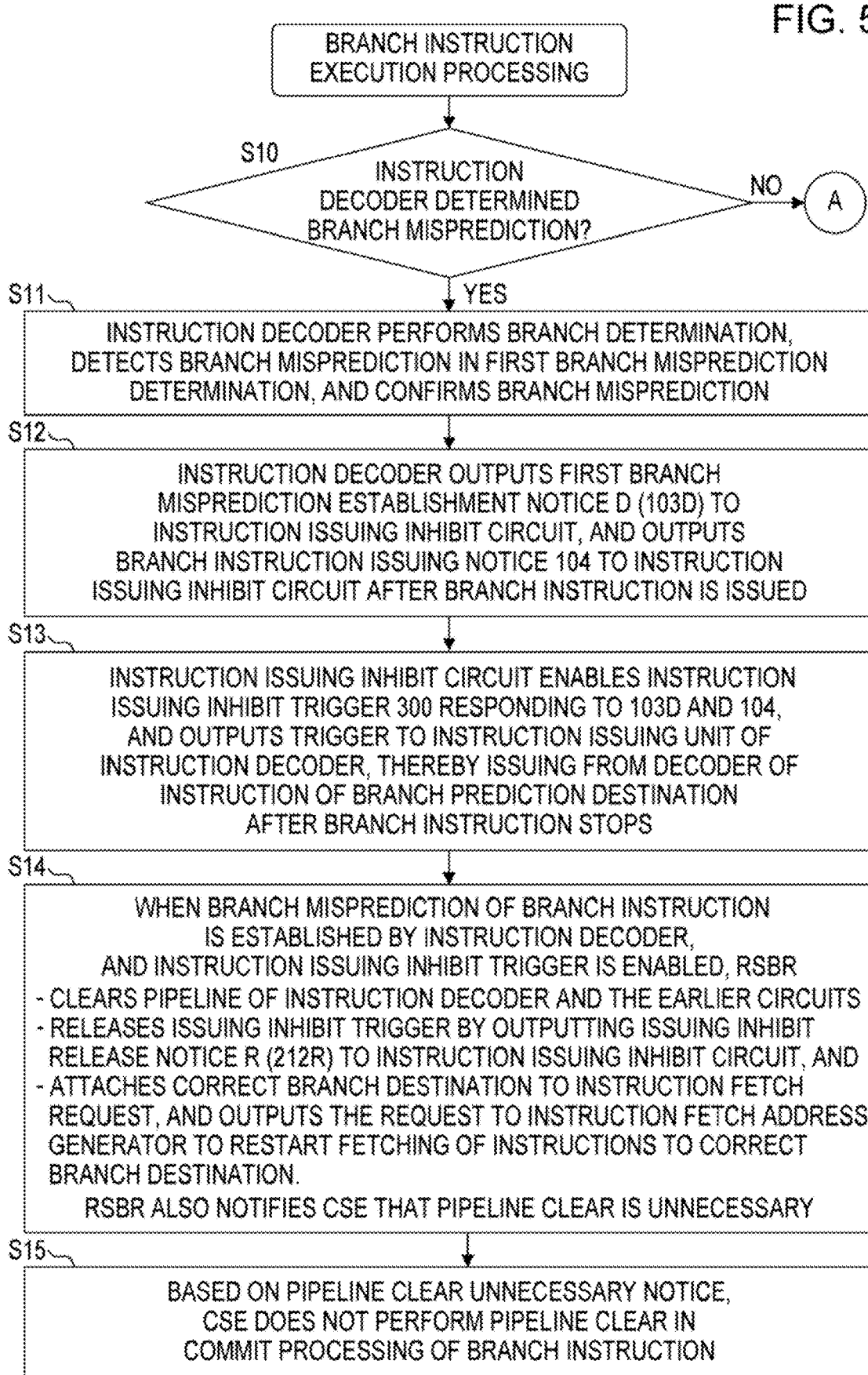
FIG. 5 and FIG. 6 are flow charts depicting the flow of the branch instruction execution processing according to this embodiment.
Figure 6:

FIG. 5 and FIG. 6 are flow charts depicting the flow of the branch instruction execution processing according to this embodiment. FIG. 5 indicates a processing when the instruction decoder can determine the branch misprediction, and FIG. 6 indicates a processing when the instruction decoder is unable to determine the branch misprediction and the RSBR is able to determine the branch misprediction. These flow charts will be referred to in the later sections. Now a configuration example of the instruction decoder and a configuration example of the RSBR will be described, and then a concrete example of the branch instruction execution processing will be described.

[Branch Determination and Branch Misprediction Determination by Instruction Decoder]

Figure 7:
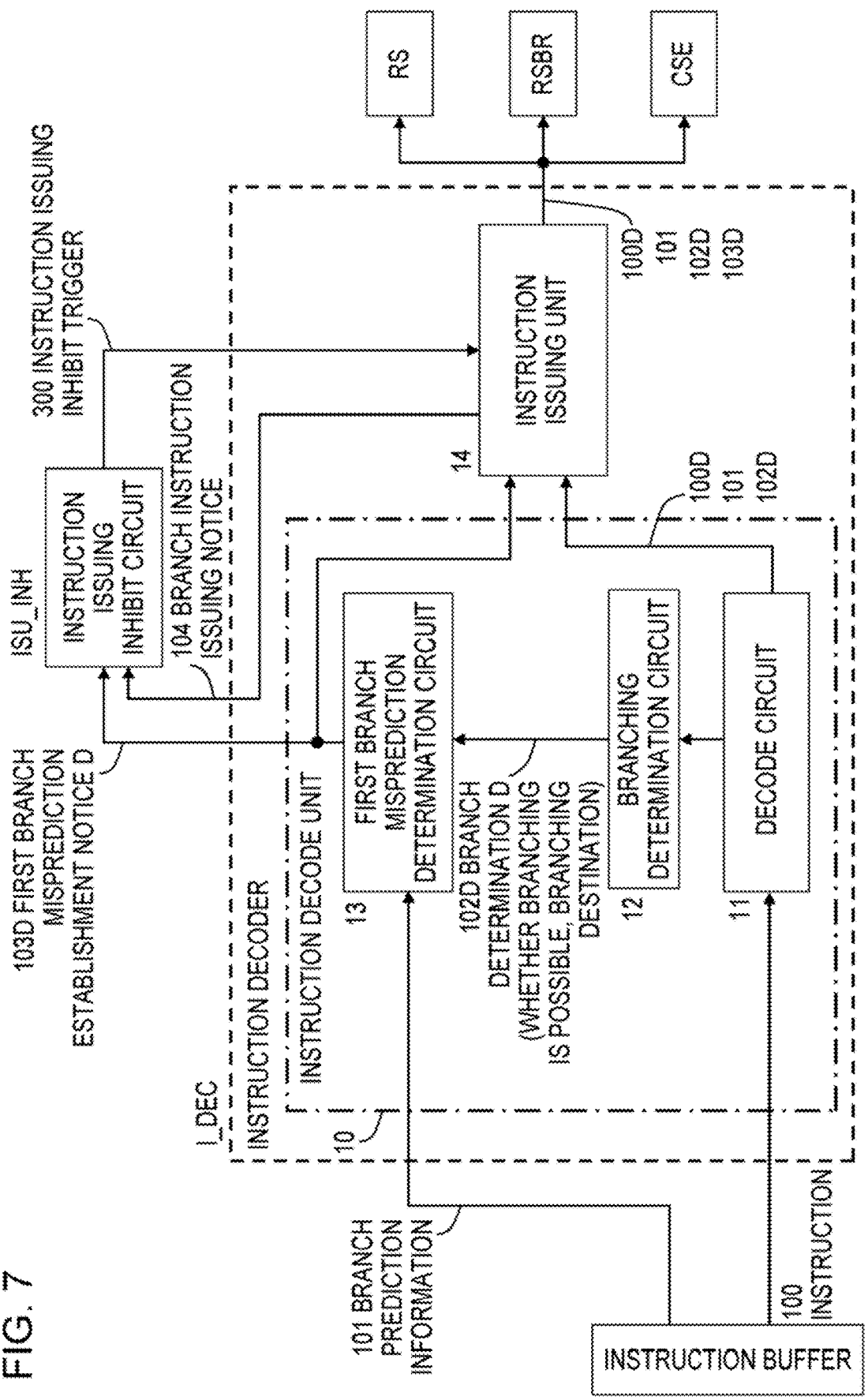
FIG. 7 is a diagram depicting a configuration example of the instruction decoder according to this embodiment.

FIG. 7 is a diagram depicting a configuration example of the instruction decoder according to this embodiment. FIG. 7 indicates the configuration of the instruction decoder I_DEC, an instruction issuing inhibit circuit ISU_INH, and various reservation stations RS, RSBR and CSE.

The instruction decoder I_DEC inputs an instruction 100 from the instruction buffer I_BUF. The decode circuit 11 in the instruction decode unit 10 decodes the inputted instruction, and the instruction issuing unit 14 issues the decoded instruction 100D to the reservation stations RS, RSBR, and CSE. The instruction 100, to which the branch prediction information 101 of the branch prediction circuit is attached, is inputted to the instruction decoder I_DEC, and the branch prediction information 101 is also attached to the decoded instruction 100D. The branch prediction information 101 includes the result of determining whether branching is possible, and the branch prediction destination.

In this embodiment, in addition to the decode circuit 11, the instruction decode unit 10 in the instruction decoder I_DEC includes a branch determination circuit 12, which performs the branch determination of the branch instruction (determining whether branching is possible, and the branch destination), and a first branch misprediction determination circuit 13, which compares the branch determination D (whether branching is possible and the branch destination) 102D and the branch prediction information (whether branching is possible, and the branch prediction destination) 101 and determines whether a branch misprediction occurred.

When the inputted instruction 100 is decoded, the decode circuit 11 can distinguish whether the instruction 100 is a branch instruction, and can distinguish whether the branch instruction is (1) an unconditional branch instruction (PC relative), (2) an unconditional branch instruction (register indirect), or (3) a conditional branch instruction.

Based on the above distinction result received from the decode circuit 11, the branch determination circuit 12 determines that branching is possible and the branch destination is TARGET in the case of (1) an unconditional branch instruction (PC relative). Further, the branch determination circuit 12 determines that branching is possible but the branch destination is undecided in the case of (2) an unconditional branch instruction (register indirect). Furthermore, the branch determination circuit 12 determines that the branching possibility is undecided, and the branch destination is undecided in the case of (3) a conditional branch instruction. The branch determination 102D of (1) and (2) are inputted to the first branch misprediction determination circuit 13.

The first branch misprediction determination circuit 13 in the instruction decode unit 10 compares the branch determination D (whether branching is possible and the branch destination) 102D in the branch determination circuit 12, and the branch prediction information 101 (whether branching is possible and the branch destination) and executes a first branch misprediction determination.

In the case of (1) an unconditional branch instruction (PC relative), the branch determination 102D is that branching is possible and the branch destination is TARGET, hence the comparison result becomes inconsistent when the branch prediction information 101 indicates that branching is not possible. Even if the branch prediction information 101 indicates that branching is possible, when the branch prediction destination is different from the branch destination of the branch determination 102D, the comparison result is still inconsistent. In other words, in either case, a branch misprediction is established.

In the case of (2) an unconditional branch instruction (register indirect), the branch determination 102D is that branching is possible and the branch destination is undecided, hence the comparison result becomes inconsistent and a branch misprediction is established when the branch prediction information 101 indicates that branching is not possible. But in other cases, the branch misprediction is not established. In the case of (3) a conditional branch instruction, the first branch misprediction determination circuit 13 determines that a branch misprediction is not established.

In the case where the branch misprediction is established, the first branch misprediction determination circuit 13 outputs a branch misprediction establishment notice D (103D) to the instruction issuing inhibit circuit ISU_INH. When the branch instruction is issued, the instruction issuing unit 14 outputs a branch instruction issuing notice 104 to the instruction issuing inhibit circuit ISU_INH.

[Instruction Issuing Inhibit Circuit]

Figure 8:
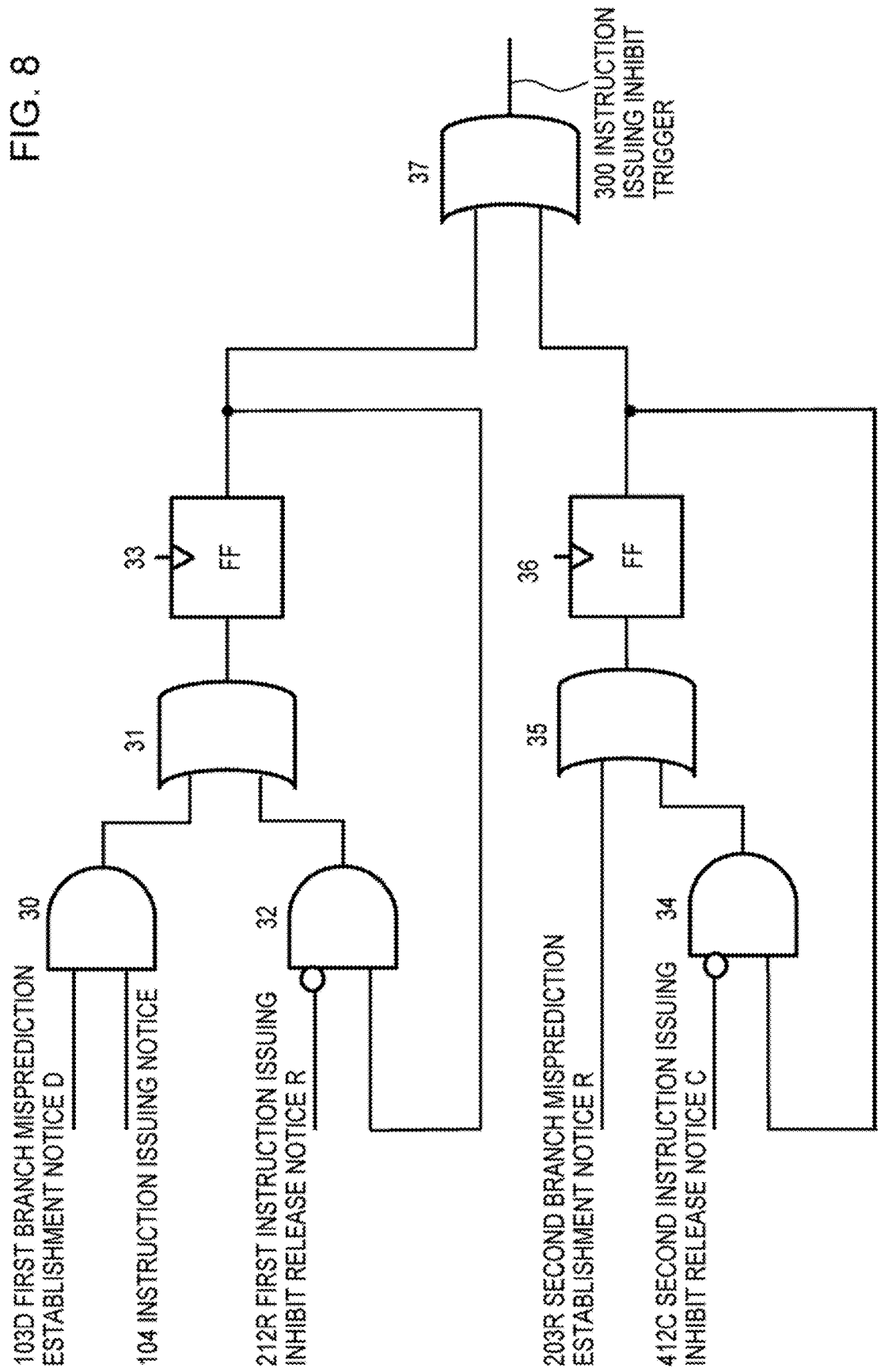
FIG. 8 is a diagram depicting a configuration example of the instruction issuing inhibit circuit.

FIG. 8 is a diagram depicting a configuration example of the instruction issuing inhibit circuit. When both the first branch misprediction establishment notice D (103D) and the branch instruction issuing notice 104 outputted from the instruction decoder become enable "1", the output of the AND circuit 30 becomes "1", then a flip-flop 33 stores an instruction issuing inhibit trigger 300 at the enable "1" state by synchronizing with the clock CLK via an OR circuit 31. Then the instruction issuing inhibit trigger 300 in the enable "1" state is outputted via an OR circuit 37. As illustrated in FIG. 7, when this instruction issuing inhibit trigger 300 becomes enable "1", the instruction issuing unit 14 inhibits (forbids) issuing of instructions from the instruction decoder.

In the instruction issuing inhibit circuit, in the case where a second branch misprediction establishment notice R (203R), which is outputted from the later mentioned RSBR, becomes enable "1" as well, the flip-flop 36 stores the instruction issuing inhibit trigger 300 at the enable "1" state by synchronizing with the clock CLK via an OR circuit 35. Then the instruction issuing inhibit trigger 300 in the enable "1" state is outputted via the OR circuit 37. Thereby the instruction issuing unit 14 inhibits (forbids) issuing of instructions from the instruction decoder.

In the case where a first issuing inhibit release notice R (212R), which is outputted from the later mentioned RSBR, becomes enable "1", on the other hand, the output of an AND circuit 32 becomes disable "0", then in the instruction issuing inhibit circuit, the flip-flop 33 stores the instruction issuing inhibit trigger 300 at the disable "0" state by synchronizing with the clock CLK via the OR circuit 31. Thereby the instruction issuing inhibit state is released, and the instruction issuing unit 14 starts issuing the decoded instructions. In the case where a later mentioned second issuing inhibit release notice C (412C), which is outputted from the later mentioned CSE, becomes enable "1", the output of the AND circuit 34 becomes disable "0", and a flip-flop 36 stores the instruction issuing inhibit trigger 300 in the disable "0" state by synchronizing with the clock CLK via the OR circuit 35. In this case as well, the instruction issuing inhibit state is released, and the instruction issuing unit 14 starts issuing the decoded instructions.

[RSBR]

Figure 9:
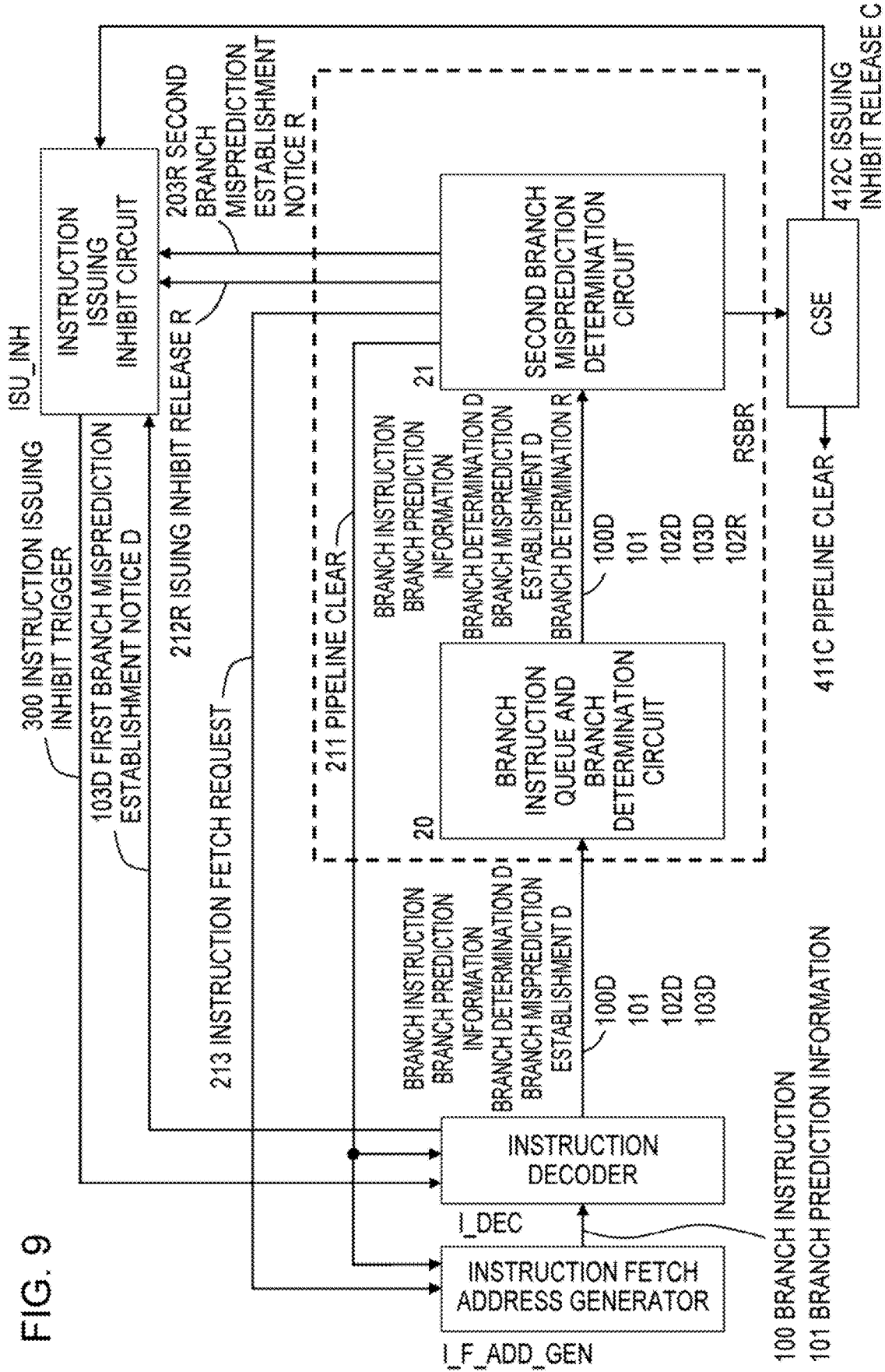
FIG. 9 is a diagram depicting a configuration example of the RSBR according to this embodiment.

FIG. 9 is a diagram depicting a configuration example of the RSBR according to this embodiment. FIG. 9 also depicts the instruction fetch address generator I_F_ADD_GEN, the instruction decoder I_DEC, the instruction issuing inhibit circuit ISU_INH, and the CSE. The RSBR inputs a decoded instruction 100D which the instruction decoder I_DEC issues in-order.

The branch prediction information 101, the branch determination D (102D) generated by the instruction decoder, and the first branch misprediction establishment notice D (103D) are attached to this branch instruction 100D. The RSBR detects that the instruction decoder did not execute the instruction issuing inhibit when the branch determination D 102D attached to the instruction 100D indicates that the branch is not determined, or when the branch misprediction establishment notice D (103D) indicates that the branch misprediction is not established.

The RSBR includes a branch instruction queue 20 and a second branch misprediction determination circuit 21. The branch instruction queue 20 includes a branch instruction queue which generates an entry for an inputted branch instruction 100D, and information which is attached to the branch instruction 100D, and each branch instruction queue includes a branch determination circuit which determines the branching of the branch instruction 1000 of the entry. In the case where the instruction decoder cannot complete the determination destination, this branch determination circuit of the RSBR executes and completes the branch determination. In other words, a register value (branch destination address) of the unconditional branch instruction (register indirect) is inputted from the arithmetic circuit to the RSBR, and the branch determination of the RSBR detects the branch destination. Or, an operation result of the branch condition of the conditional branch instruction is inputted from the arithmetic circuit to the RSBR, and the branch determination of the RSBR determines whether branching is possible, and detects the branch destination.

The branch instruction queue 20 outputs the branch instruction in-order after branching is determined. In the case of the branch instruction B in FIG. 4, for example, the branch instruction B is correctly executed when the branch instruction B exists in a correct branch destination of the earlier branch instruction earlier to the branch instruction B. If the branch instruction B does not exist in the correct branch destination of the earlier branch instruction earlier to the branch instruction B, the branch instruction B is cleared from the branch instruction queue 20, as a result of the branch determination of the earlier branch instruction earlier to the branch instruction B, and is never executed. This means that the first branch instruction of the branch instruction queue 20 is a branch instruction of which correct execution is established.

The branch instruction queue 20 outputs: the branch instruction 100D and information attached thereto, that is, branch prediction information 101, branch determination D (102D) determined in the instruction decoder, first branch misprediction determination notice D (103D) and branch determination R determined by the RSBR (102R), to the branch misprediction determination circuit 21. When the instruction decoder did not establish the branch misprediction, the second branch misprediction determination circuit 21 compares the branch determined 102R by the RSBR and the branch prediction information 101, and executes the second branch misprediction determination.

The operation by the second branch misprediction determination circuit 21 in two different cases will be described.

(1) Processing in the Case where the Instruction Decoder Enables the First Branch Misprediction Establishment Notice D (103D) (Branch Misprediction is Established)

In this case, the second branch misprediction determination circuit 21 distinguishes that the instruction decoder already inhibited issuing instructions. Then the second branch misprediction determination circuit 21 clears the pipeline by issuing the pipeline clear instruction 211 to the pipeline circuits from the instruction fetch address generator to the instruction decoder I_DEC (instruction decoder, instruction buffer, instruction fetch address generator etc.). Further, the second branch misprediction determination circuit 21 issues the first issuing inhibit release notice R (212R) to the instruction issuing inhibit circuit ISU_INH to release the instruction issuing inhibit state, and issues the instruction fetch request 213 to the instruction fetch address generator I_F_ADD_GEN, to request fetching the instructions to the correct branch destination. The correct branch destination information detected by the branch determination is attached to the instruction fetch request 213, and based on this correct branch destination information, the instruction fetch address generator starts fetching the instructions.

In this case, the RSBR notifies CSE that a pipeline clear is unnecessary in the commit processing of the branch instruction.

(2) In the Case where the Instruction Decoder Disables the First Branch Misprediction Establishment Notice D (103D) (Branch Misprediction Unestablished)

In this case, the second branch misprediction determination circuit 21 distinguishes that the instruction decoder does not inhibit issuing instructions. Then the second branch misprediction determination circuit 21 issues the pipeline clear instruction 211 to the pipeline circuits from the instruction fetch address generator to the instruction decoder I_DEC, and clears the pipeline circuit. Further, the second branch misprediction determination circuit 21 issues the second branch misprediction establishment notice R (203R) to the instruction issuing inhibit circuit ISU_INH, and enables the instruction issuing inhibit trigger 300 (issuing inhibit state), and issues the instruction fetch request 213 to the instruction fetch address generator I_F_ADD_GEN, to request fetching instructions to the correct branch destination.

In this case, the RSBR notifies the CSE that a pipeline clear is needed in the completion processing of the branch instruction.

Processing of the branch instruction executed by the core of the processor will be described for a first embodiment where the pipeline structure has a single line, and for a second embodiment where the pipeline structure has a plurality of lines. For each pipeline structure, (1) processing when the instruction decoder determines the branch misprediction and the branch misprediction is established, and (2) processing when the instruction decoder cannot determine the branch misprediction and the branch misprediction is not established, will be described herein below.

Embodiment 1: In the Case where the Instruction Fetch Address Generation Circuit and the Instruction Decoder Constitute a Single Line Pipeline Structure (FIG. 10, FIG. 11)

In Embodiment 1, processing for a branch instruction for a pipeline structure where the instruction fetch address generation circuit, the instruction decoder and the like constitute a single line will be described with reference to the flow charts in FIGS. 5 and 6 and the configurations of the instruction decoder, instruction issuing inhibit circuit and RSBR illustrated in FIGS. 7, 8 and 9.

Figure 10:
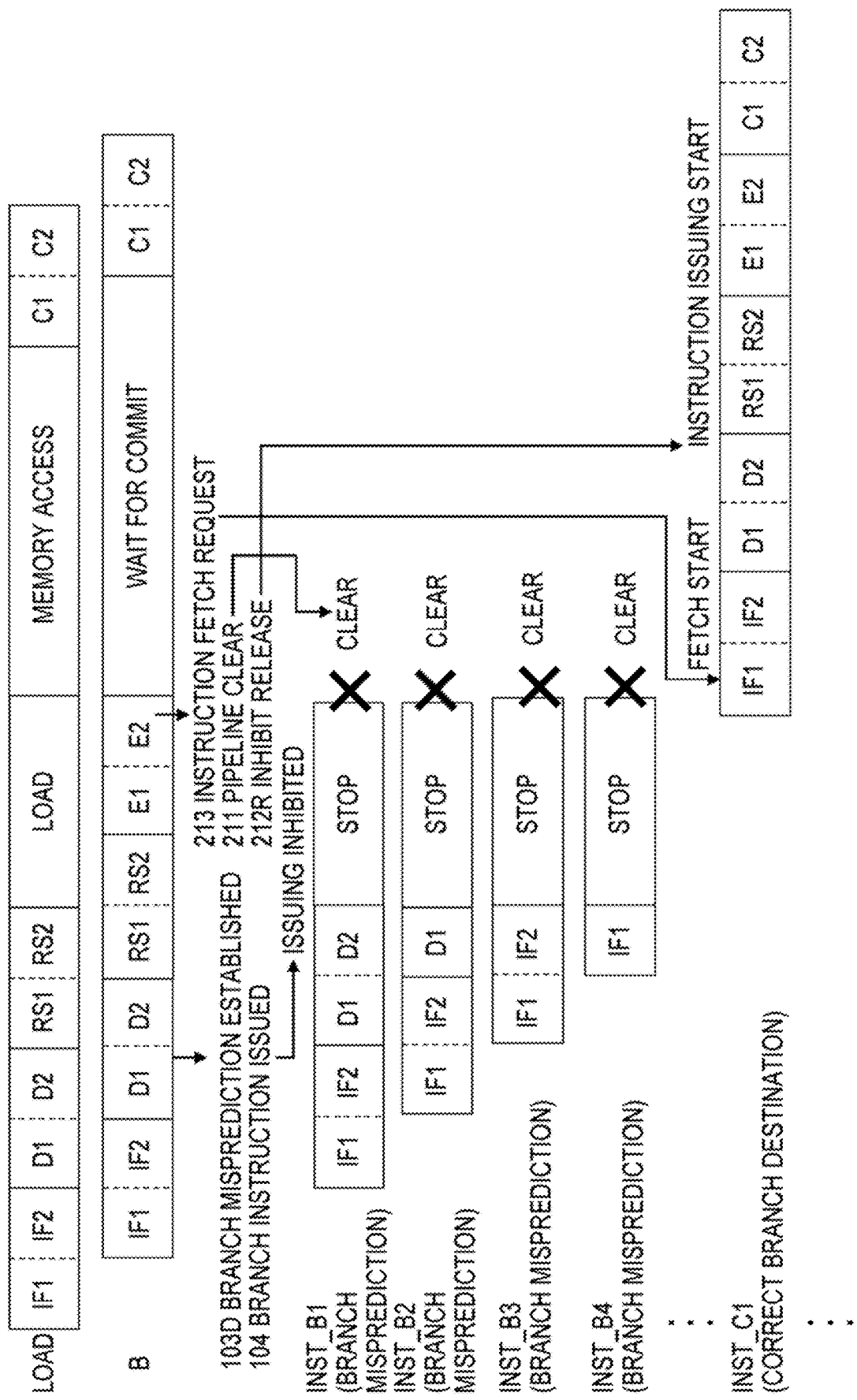
FIG. 10 is a timing chart of the processing for a branch instruction in the case where the instruction decoder determines the branch misprediction, and the branch prediction is established.
Figure 11:
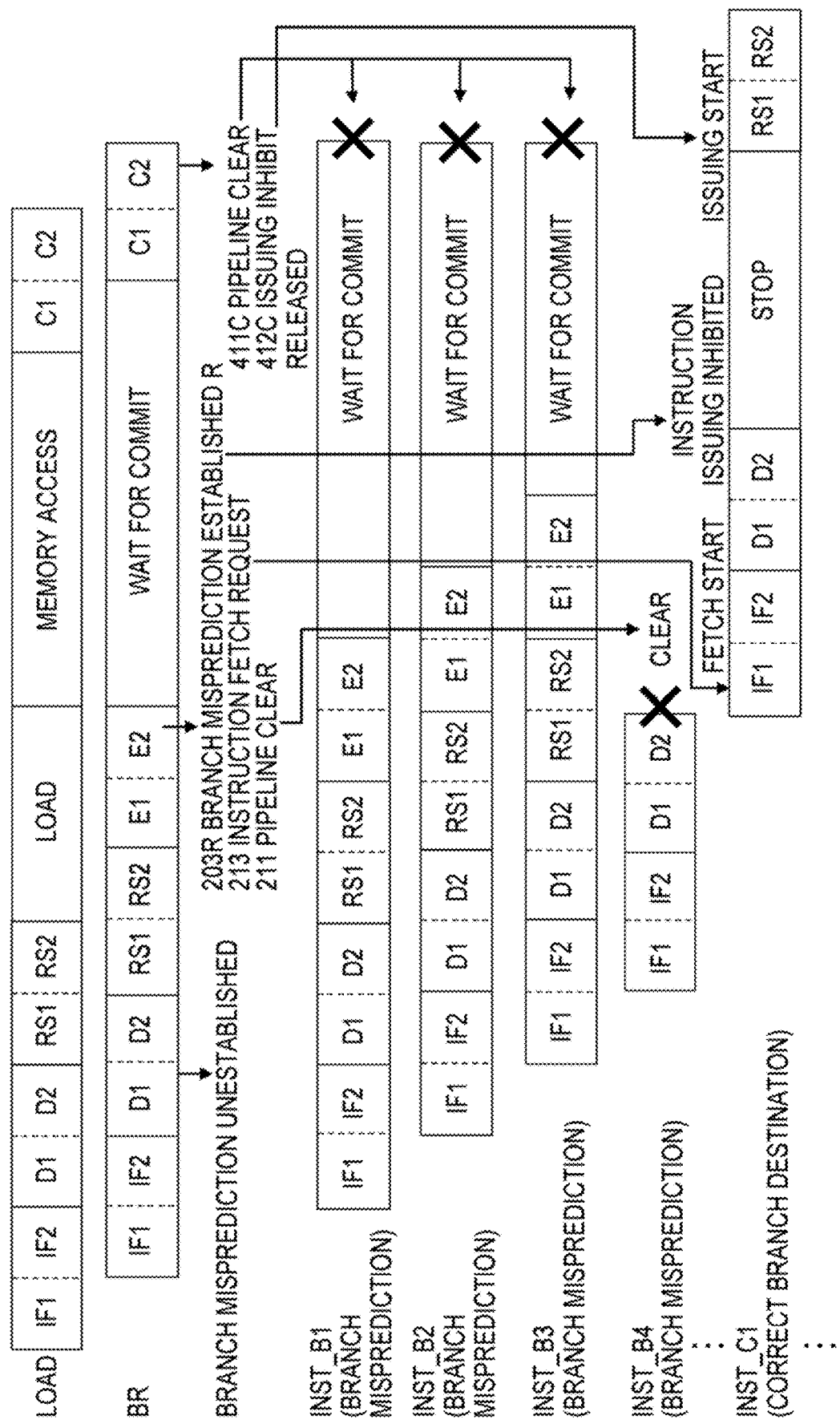
FIG. 11 is a timing chart of the processing for a branch instruction in the case where the instruction decoder cannot determine the branch misprediction, and the branch misprediction is not established.

(1) Processing in the Case where the Instruction Decoder Determines the Branch Misprediction and Branch Misprediction is Established FIG. 10 is a timing chart of the processing for a branch instruction in the case where the instruction decoder determines the branch misprediction, and the branch prediction is established. The instruction string is the instruction string indicated in FIG. 4, and the branch instruction is an unconditional branch instruction B (PC relative), for example. The processor executes the processing in the steps S11 to S15 in FIG. 5.

FIG. 14 is a table indicating the operation cycles of the pipeline circuit. As listed in FIG. 14, IF1 and IF2 are the first cycle and second cycle of the instruction fetch in the instruction fetch address generation circuit. D1 and D2 are the first cycle and the second cycle of the instruction decode in the instruction decoder. RS1 and RS2 are the first cycle and the second cycle in the reservation station. E1 and E2 are the first cycle and the second cycle in the instruction execution unit. And C1 and C2 are the first cycle and the second cycle of the commit processing (completion processing) in CSE.

A number of cycles of each operation mentioned above is an example, and the number of cycles may differ depending on the structure of the processor, but this embodiment can be applied even when the number of cycles is changed.

In FIG. 10, the load instruction LOAD, the branch instruction B, and the instruction strings INST_B1, B2, B3 and B4 at the branch prediction destination perform the instruction fetch cycles IF1 and IF2, the instruction decode cycles D1 and D2, the reservation station cycles R1 and R2, and the instruction execution cycles E1 and E2 at a timing shifted by one cycle respectively. The time from the instruction execution cycles E1 and E2 to the commit cycles C1 and C2 differ depending on the execution time of the instructions, but the commit cycles C1 and C2 of each instruction are also shifted since the CSE performs commit processing in-order.

The instruction decoder performs the branch determination for the branch instruction B in the decode cycle D1, and the branch misprediction is established in the first branch misprediction determination (S11). Responding to this, the instruction decoder sends the first branch misprediction establishment notice D (103D) to the instruction issuing inhibit circuit ISU-INH, and the instruction issuing unit 14 of the instruction decoder issues the branch instruction in the decode cycle D2, then the instruction decoder sends the branch instruction issuing notice 104 to the instruction issuing inhibit circuit (S12). The issued branch instruction B is entered in the instruction queue in the RSBR, and the processing of the branch instruction is executed.

Responding to the first branch prediction misprediction establishment notice D (103D) and the branch instruction issuing notice 104, the instruction issuing inhibit circuit enables the instruction issuing inhibit trigger 300 to "1", and the instruction issuing unit 14 of the instruction decoder inhibits (forbids) issuing of subsequent instructions (S13). As a result, each instruction of the instruction string INST_B1 to INST_B4 to the branch prediction destination of the branch instruction B is fetched and decoded respectively, but is not issued from the instruction decoder, and the pipeline processing of these instructions is temporarily stopped.

The issued branch instruction B is inputted to the RSBR. Since the first branch misprediction establishment notice D (103D) of the instruction decoder attached to the branch instruction B is enable "1", the RSBR detects that the instruction decoder inhibited issuing of the instructions (S14).

The second branch misprediction determination circuit 21 of the RSBR sends the pipeline clear instruction 211 in the instruction execution cycles E1 and E2 to the pipeline circuits from the instruction fetch address generator to the instruction decoder, so as to clear the pipeline circuits from the instruction fetch address generator to the instruction decoder (S14). Thereby the pipeline state of the instructions INST_B1 to B4 in the branch misprediction direction is cleared (X in FIG. 10). Further, the second branch misprediction determination circuit 21 of the RSBR sends the first issuing inhibit release notice R (212R) to the instruction issuing inhibit circuit, so as to release the instruction issuing inhibit trigger, and releases the issuing inhibit state of the instruction issuing unit 14 of the instruction decoder (S14). Further, the second branch misprediction determination circuit 21 of the RSBR attaches a correct branch destination address to the instruction fetch request 213, and sends this instruction fetch request 213 to the instruction fetch address generation circuit, so as to request fetching the instruction strings INST_C1 and C2 to the correct branch destination. In the example in FIG. 10, the state of the instruction strings INST_C1 and C2 to the correct branch destination in the pipeline circuit is not cleared by the pipeline clear instruction 211, but may be cleared depending on the timing. The above-mentioned pipeline clear instruction 211, the issuing inhibit release notice R (212R) and the instruction fetch request 213 may be the same signal.

When the processing of the branch instruction ends, the RSBR notifies the CSE that processing ended, and at this time notifies that a pipeline clear is not necessary in the commit processing (S14). Thereby the CSE does not execute pipeline clear in the commit processing of the branch instruction B (S15).

Responding to the instruction fetch request from the RSBR, the instruction fetch of the instructions INST_C1 and C2 to the correct branch destination is started, and since the issuing inhibit by the instruction decoder has already been released, the instructions INST_C1 and C2 to the correct branch destination are issued from the instruction decoder.

As mentioned above, the instruction decoder, which is disposed in an earlier stage of the pipeline circuit, performs the branch determination for the branch instruction and the first branch misprediction determination, and when the instruction decoder detects the branch misprediction and the branch misprediction is established, the instruction decoder forbids issuing of the instruction string to the branch prediction destination of the branch instruction. Along with this, the RSBR clears the pipeline circuits from the instruction fetch address generator to the instruction decoder (211), and when the instruction fetch request 213 and the instruction issuing inhibit release notice 212R are sent from the RSBR, the instructions INST_C1 and C2, to correct branch destination, can be issued from the instruction decoder. In other words, the state, where issuing of the instruction to the correct branch destination from the instruction decoder is inhibited until the commit processing of the branch instruction is performed by the CSE, can be prevented.

For example, in the case where the load instruction LOAD before the to branch instruction B causes a cache miss and memory access is executed, the commit processing of the branch instruction B by the CSE delays. However, the issuing inhibit by the instruction decoder can be released in the stage of the RSBR, as mentioned above, hence the state, where issuing of the instructions to the correct branch destination is forbidden until the commit processing of the branch instruction is performed, can be prevented. As a result, processing efficiency of the instruction string of the program can be increased.

Further, when the instruction decoder detects a branch misprediction of a branch instruction, the instruction decoder inhibits issuing of the instruction to the branch prediction destination, which is speculatively executed, from the instruction decoder, hence execution of the load instruction LOAD1 R0, which is speculatively executed, as described in FIG. 3, can be inhibited, and security level of the processor can be improved.

(2) Processing in the Case where the Instruction Decoder cannot Determine Branch Misprediction and Branch Misprediction is Unestablished FIG. 11 is a timing chart of the processing for a branch instruction in the case where the instruction decoder cannot determine the branch misprediction, and the branch misprediction is not established. The instruction string is the instruction string indicated in FIG. 4, but the branch instruction B is an unconditional branch instruction (register indirect) or conditional branch instruction, for example. In FIG. 11, an unconditional branch instruction BR of the register indirect is indicated as an example. The processor executes the processing in steps S16 to S19 in FIG. 6.

The instruction decoder performs the branch determination for the branch instruction and the first branch misprediction determination, but cannot determine the branch misprediction (S16). For example, in the case where the branch instruction is the unconditional branch instruction BR (register indirect), and the reading of the address of the register is not completed, or in the case where the branch instruction is a conditional branch instruction and the operation result of the condition is not completed, the instruction decoder cannot output the first branch prediction establishment notice D (103D) in the first branch misprediction determination. Hence the instruction decoder continues issuing of the instructions INST_B1, B2 and B3 to the branch prediction destination of the branch instruction.

Then in cycles RS1 and RS2, the RSBR processes the branch instruction BR, which becomes the first instruction of the branch instruction queue. In other words, being the first instruction of the branch instruction queue means that the branch instruction BR is the branch instruction to the correct branch destination of the previous branch instruction.

Based on the information attached to the branch instruction, the RSBR detects that the branch misprediction was not determined by the instruction decoder (branch misprediction is unestablished), and performs the branch determination so as to detect whether the branching of the branch instruction is possible and the branch destination, and performs the second branch misprediction determination to determine whether the branch misprediction occurred (S17). The RSBR has already received the branch destination address in the register for the unconditional branch instruction (register indirect), and the operation result of the condition for the conditional branch instruction, from the arithmetic unit respectively, therefore can perform the second branch misprediction determination.

When the RSBR detects a branch misprediction in the second branch misprediction determination in the instruction execution cycles E1 and E2, the RSBR clears the pipeline circuits from the instruction fetch address generator to the instruction decoder (211), and outputs the second branch misprediction establishment notice R (203R) to the instruction issuing inhibit circuit, and enables the issuing inhibit trigger to enable "1" to forbid the instruction issuing from the instruction decoder. Then the RSBR outputs the instruction fetch request (213) to the instruction fetch address generator, so as to start fetching the instructions to the correct branch destination (S18). Thereby the pipeline circuits from the instruction fetch address generator to the instruction decoder of the instruction INST_B4 is cleared (X in FIG. 11), and the instruction INST_C1 to the correct branch destination is fetched and decoded by the instruction decoder, but the issuing from the instruction issuing unit is inhibited (forbidden).

When the processing of the branch instruction BR ends, the RSBR notifies the CSE the end of the processing, and at this time requests for a pipeline clear in the commit processing (S18). Then the branch instruction BR enters the commit processing wait state until the commit processing of the previous load instruction (cycles C1 and C2) is performed. Then after the commit processing of the load instruction, the commit processing of the branch instruction BR is performed by the CSE.

The CSE performs the commit processing of the branch instruction BR (S19). In the commit processing of the branch instruction BR, the CSE clears the states of the instructions INST_B1, B2 and B3 to the branch prediction destination in the pipeline circuits (X in FIG. 11) by issuing the pipeline clear 411C, changes the program counter PC to the address of the instruction INST_C1 to the correct branch destination, and outputs the issuing inhibit release notice C (412C) to the instruction issuing inhibit circuit, so as to disable the instruction issuing inhibit trigger 300 (inhibit release state). Thereby the instructions INST_C1 and C2 to the correct branch destination, waiting for issue, start being issued from the instruction decoder.

As mentioned above, in the case where the instruction decoder cannot determine the branch misprediction of the branch instruction BR, the RSBR performs the branch determination and the branch misprediction determination of the branch instruction. When the branch misprediction is detected, the RSBR starts fetching the instructions to the correct branch destination, instead of fetching the instructions to the branch prediction destination, and causes the fetched instructions to the correct branch destination to stand by in the state where issuing is forbidden from the instruction decoder. Then when the CSE performs the commit processing of the branch instruction BR, the CSE clears the pipeline circuit, releases the inhibit of issuing the instruction from the instruction decoder, and starts issuing instructions to the correct branch destination from the instruction decoder. In this case, issuing of the instructions to the correct branch destination wait until the CSE performs the commit processing of the branch instruction.

Figure 12:
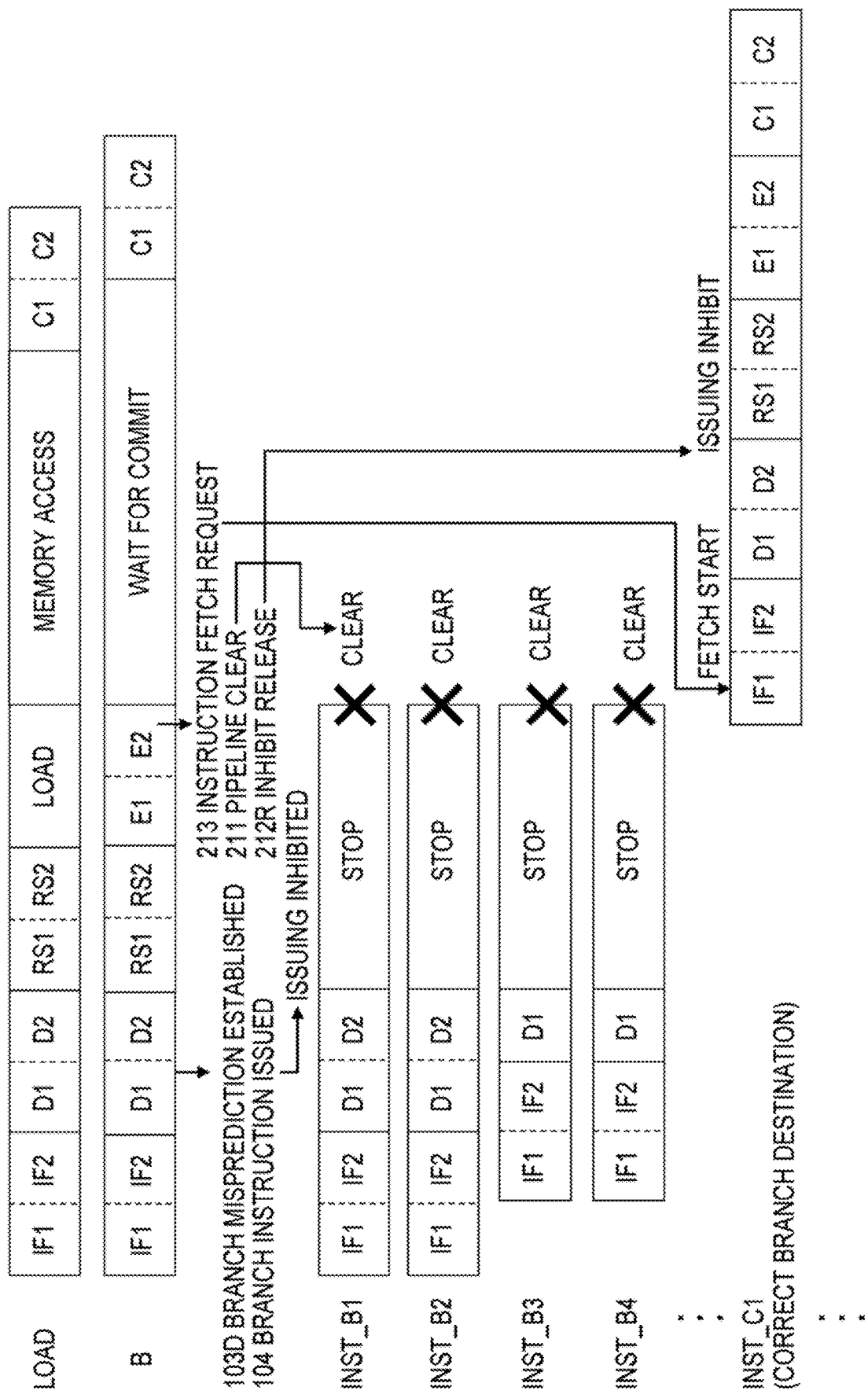
FIG. 12 is a timing chart of the processing for a branch instruction in the case where the instruction decoder determines the branch misprediction, and the branch misprediction is established.
Figure 13:
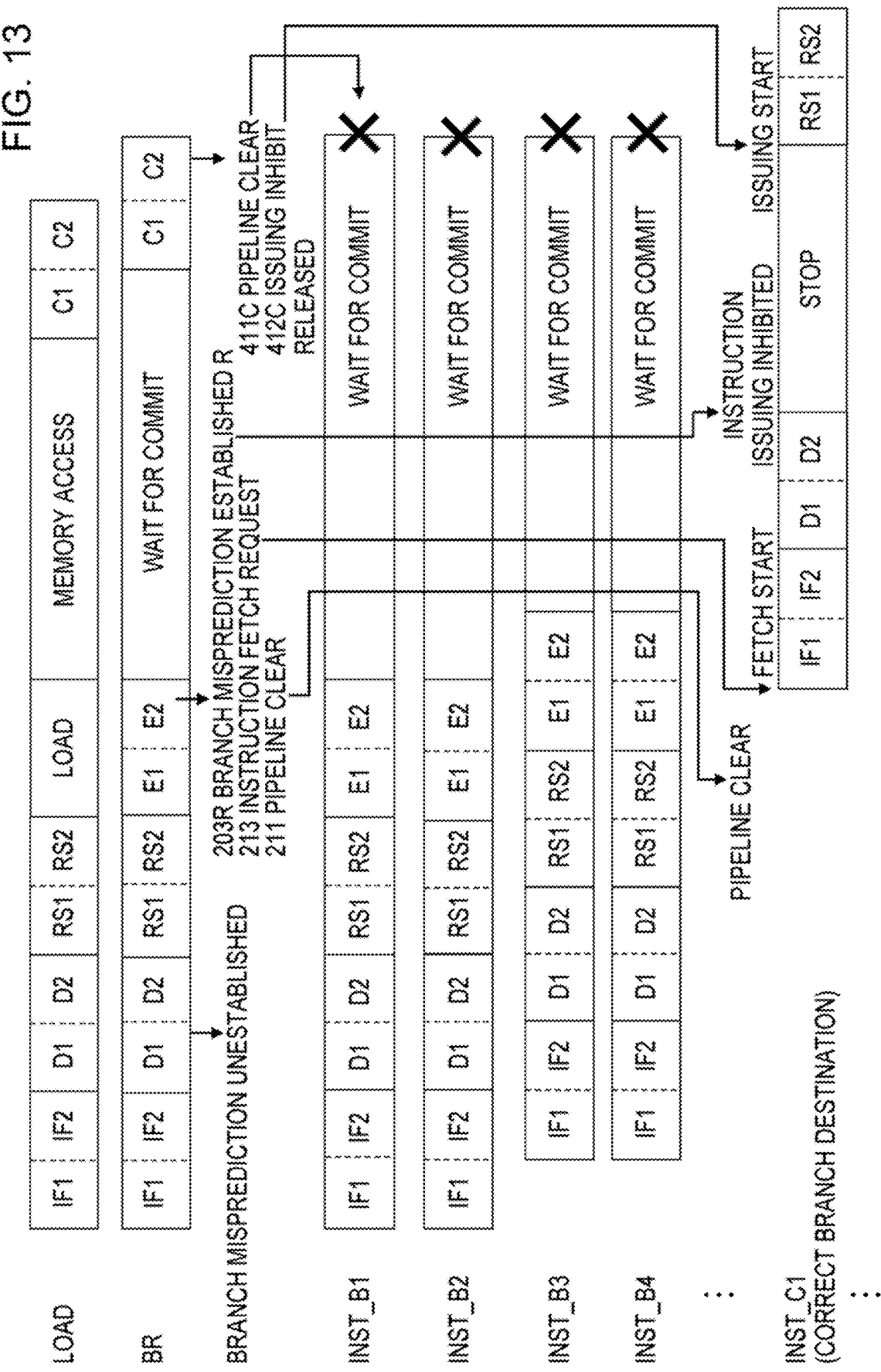
FIG. 13 is a timing chart of the processing for a branch instruction in the case where the instruction decoder cannot determine the branch misprediction, and the branch misprediction is not established.

Embodiment 2: in the Case where the Instruction Fetch Address Generation Circuit and the Instruction Decoder Constitute a Plurality of Lines of Pipeline Structure (FIG. 12, FIG. 13)

In Embodiment 2, processing for a branch instruction for a pipeline structure where the instruction fetch address generation circuit, the instruction decoder and the like constitute a plurality of lines (four lines in parallel), will be described with reference to the charts in FIGS. 5 and 6 and the configurations of the instruction decoder, instruction issuing inhibit circuit and RSBR in FIGS. 7, 8 and 9.

(1) Processing in the Case where the Instruction Decoder Determines the Branch Misprediction and Branch Misprediction is Established.

FIG. 12 is a timing chart of the processing for a branch instruction in the case where the instruction decoder determines the branch misprediction, and the branch misprediction is established. Since the pipeline has the structure of four lines disposed in parallel, the instruction fetches IF1 and IF2, the instruction decodes D1 and D2, the processing RS1 and RS2 of the reservation station, and the instruction execution processing E1 and E2 are performed in four parallel lines in the timing chart in FIG. 12. The processing of the instruction decoder, the processing of RSBR and the processing of the CSE, however, are the same as the timing chart in FIG. 10 of Embodiment 1. Therefore, in the processing in FIG. 12, processing different from the processing in FIG. 10 will be mainly described.

As illustrated in FIG. 12, the four instructions of the load instruction LOAD, the unconditional branch instruction B (PC relative), and the branch prediction destination instructions INST_B1 and B2 are fetched in parallel (IF1, IF2), and decoded in parallel (D1, D2). The instruction decoder performs the branch determination and the first branch misprediction determination for the branch instruction BR, and detects the branch misprediction, whereby the branch misprediction is established (S11).

Responding to the establishment of the branch misprediction, the instruction decoder inhibits issuing instructions INST_B1 and B2 after the branch instruction B which are being processed in four parallel lines. This processing is different from the processing in FIG. 10. The instruction decoder detects the branch misprediction in the cycle D1, for example, and inhibits issuing the subsequent instructions INST_B1 and B2 from the instruction decoder in the cycle D2. This issuing inhibit is not caused by the instruction issuing inhibit trigger 300. However, if the instruction issuing inhibit circuit can inhibit issuing the subsequent instructions in the cycle D2, then issuing instructions may be inhibited by the instruction issuing inhibit trigger 300.

Further, the instruction decoder outputs the first branch misprediction establishment notice D (103D) to the instruction issuing inhibit circuit (S12). Responding to this, the instruction issuing inhibit circuit enables the instruction issuing inhibit trigger 300 (inhibit state) (S13). Responding to this, the instruction decoder forbids issuing instructions from the four instructions fetched in the next cycle. This processing is the same as the processing in FIG. 10. The instruction issuing inhibit trigger 300 becomes enable (inhibit state), and issuing of instructions INST_B3 and B4 from the instruction decoder is forbidden.

The RSBR processes the branch instruction B, and if the RSBR detects the branch misprediction establishment in the instruction execution cycles E1 and E2, the RSBR outputs the pipeline clear instruction 211, the first issuing inhibit release notice R (212R), and the instruction fetch request 213 respectively, just like the case of FIG. 10 (S14). Thereby the pipeline circuits from the instruction fetch address generator to instruction decoder, where issuing of the instructions INST_B1 to INST_B4 from the instruction decoder was inhibited, is cleared (X in FIG. 13). Further, the instructions INST_C1 and C2 to the correct branch destination are fetched and issued from the instruction decoder, and operation of each issued instruction is executed. The CSE does not clear the pipeline by the commit processing of the branch instruction BR (S15).

(2) Processing in the Case where the Instruction Decoder cannot Determine Branch Misprediction and Branch Misprediction is Unestablished FIG. 13 is a timing chart of the processing for a branch instruction in the case where the instruction decoder cannot determine the branch misprediction, and the branch misprediction is not established. In this case, the instruction decoder cannot detect the first branch detection miss for the branch instruction BR (S16). In other words, the branch instruction BR remains in the branch misprediction unestablished state.

Then, for the branch instruction BR, the RSBR detects that the branch misprediction is established, based on the information on the branch misprediction determination attached to the branch instruction, and performs the branch determination and the second branch misprediction determination (S17). When the branch misprediction is detected in the instruction execution cycles E1 and E2, the RSBR clears the pipeline circuits from the instruction fetch address generator to the instruction decoder, outputs the instruction fetch request to the instruction fetch address generator to start fetching instructions to the correct branch destination, and outputs the second branch misprediction establishment notice R (203R) to the instruction issuing inhibit circuit to forbid issuing of instructions from the instruction decoder (S18).

Then the processing of the branch instruction ends, and the RSBR notifies the CSE the end of processing. Then after performing the commit processing of the load instruction, the CSE performs the commit processing of the branch instruction. In this commit processing, the CSE outputs the pipeline clear 411, so as to clear the state of the pipeline circuits of the instructions executed due to the branch misprediction after the branch instruction BR (X in FIG. 13). Further, the CSE outputs the issuing inhibit release notice C (412C), so as to release the instruction issuing inhibit trigger of the instruction issuing inhibit circuit, and start the issuing instruction from the instruction decoder (S19). Thereby instructions to the correct branch destination are issued from the instruction decoder.

As described above, according to this embodiment, when the instruction decoder detects a branch misprediction of a branch instruction, issuing of instructions to the branch prediction destination of the branch instruction from the instruction decoder is inhibited, and RSBR allows the instruction decoder to start issuing instructions to a correct branch destination, hence processing efficiency at the instruction string of the program by the processor can be improved. According to the first aspect of embodiment, penalties caused by the branch misprediction of the branch instruction can be reduced.

Further, since the issuing the speculatively executed instructions to the correct branch destination is inhibited, execution of the load instructions LOAD1 R0 and the like, as described in FIG. 3, which may be speculatively executed with malicious intent, can be inhibited, which can increase the security level of the processor.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An arithmetic processing device, comprising:
a pipeline circuit including a pipeline structure which includes,
an instruction fetch circuit that fetches instructions,
an instruction decoder that decodes the fetched instructions, performs first branch misprediction determination for a branch instruction, and issues the decoded instructions in-order,
an instruction processing circuit that processes instructions other than the branch instruction issued by the instruction decoder, and
a branch instruction processing circuit to which the branch instruction issued by the instruction decoder is inputted, and which performs second branch misprediction determination for the branch instruction; and
a commit processing circuit that executes a commit processing of the instructions processed by the instruction processing circuit and the branch instruction processing circuit of the pipeline circuit in-order, wherein
when a branch misprediction is established in the first branch misprediction determination, the instruction decoder inhibits issuing of the instructions to the branch prediction destination of the branch instruction, from the instruction decoder, and
when the first branch instruction for which the branch misprediction is established by the instruction decoder is inputted, the branch instruction processing circuit clears the pipeline state in the instruction decoder and earlier circuits to the instruction decoder, allows the instruction fetch circuit to start fetching instructions to a correct branch destination, and releases the inhibit of issuing of the instructions from the instruction decoder.

2. The arithmetic processing device according to claim 1, wherein in the case where the branch misprediction is not established in the first branch misprediction determination, the instruction decoder does not inhibit issuing of instructions from the instruction decoder,
wherein in the case where a second branch instruction for which branch misprediction was not established by the instruction decoder is inputted, the branch instruction processing circuit clears the pipeline state in the instruction decoder and earlier circuits to the instruction decoder, allows the instruction fetch circuit to start fetching instructions to a correct branch destination, and inhibits issuing of instructions from the instruction decoder, and
wherein the commit processing circuit dears the inhibit of issuing of the instructions from the instruction decoder when the commit processing of the second branch instruction is performed.

3. The arithmetic processing device according to claim 2, wherein the commit processing circuit clears the pipeline state in the pipeline circuit for an instruction to a branch prediction destination when the commit processing of the second branch instruction is performed.

4. The arithmetic processing device according to claim 1, wherein the branch instruction processing circuit includes a branch instruction queue in which an entry of the inputted branch instructions is created, and a second branch misprediction determination circuit that performs the second branch misprediction determination for a branch instruction in a first entry in the branch instruction queue.

5. The arithmetic processing device according to claim 1, wherein the instruction decoder performs a first branch determination which determines whether branching of the branch instruction is possible, and determines a branch destination, and performs the first branch misprediction determination by comparing the result of the first branch determination and the branch prediction information which includes information whether the branching is possible and the branch destination, and
wherein the branch instruction processing circuit performs a second branch determination which determines whether branching of the branch instruction is possible, and determines the branch destination, and performs the second branch misprediction determination by comparing the result of the second branch determination and the branch prediction information which includes information whether the branching is possible and the branch destination.

6. The arithmetic processing device according to claim 1, wherein at least the pipeline of the instruction fetch circuit and the instruction decoder have a pipeline structure including a plurality of lines, and
wherein the instruction fetch circuit fetches a plurality of instructions in parallel, and the instruction decoder decodes the plurality of instructions in parallel and issues the decoded instructions in parallel.

7. The arithmetic processing device according to claim 6, wherein in the case where the branch misprediction is established in the first branch misprediction determination, the instruction decoder inhibits issuing of the instructions to the branch prediction destination included in the plurality of instructions decoded in parallel from the instruction decoder.

8. The arithmetic processing device according to claim 3, wherein the branch instruction processing circuit does not request the commit processing circuit to clear the pipeline circuit for the first branch instruction and requests the commit processing circuit to clear the pipeline circuit for the second branch instruction.

9. A control method of an arithmetic processing device, the method comprising:

the arithmetic processing including a pipeline circuit including a pipeline structure which includes an instruction fetch circuit that fetches instructions, an instruction decoder that decodes the fetched instructions, performs first branch misprediction determination for a branch instruction, and issues the decoded instructions in-order, an instruction processing circuit that processes instructions other than the branch instruction issued by the instruction decoder, and a branch instruction processing circuit to which the branch instruction issued by the instruction decoder is inputted, and which performs second branch misprediction determination for the branch instruction; and a commit processing circuit that executes the commit processing of the instructions processed by the instruction processing circuit and the branch instruction processing circuit of the pipeline circuit in-order, when a branch misprediction is established in the first branch misprediction determination, the instruction decoder inhibiting issuing of the instructions to the branch prediction destination of the branch instruction, from the instruction decoder; and when the first branch instruction for which the branch misprediction was established by the instruction decoder is inputted, the branch instruction processing circuit clearing the pipeline state in the instruction decoder and earlier circuits to the instruction decoder, allowing the instruction fetch circuit start fetching instructions to a correct branch destination, and releasing the inhibit of issuing of the instructions from the instruction decoder.

* * * * *